UNITED STATES PATENT OFFICE.

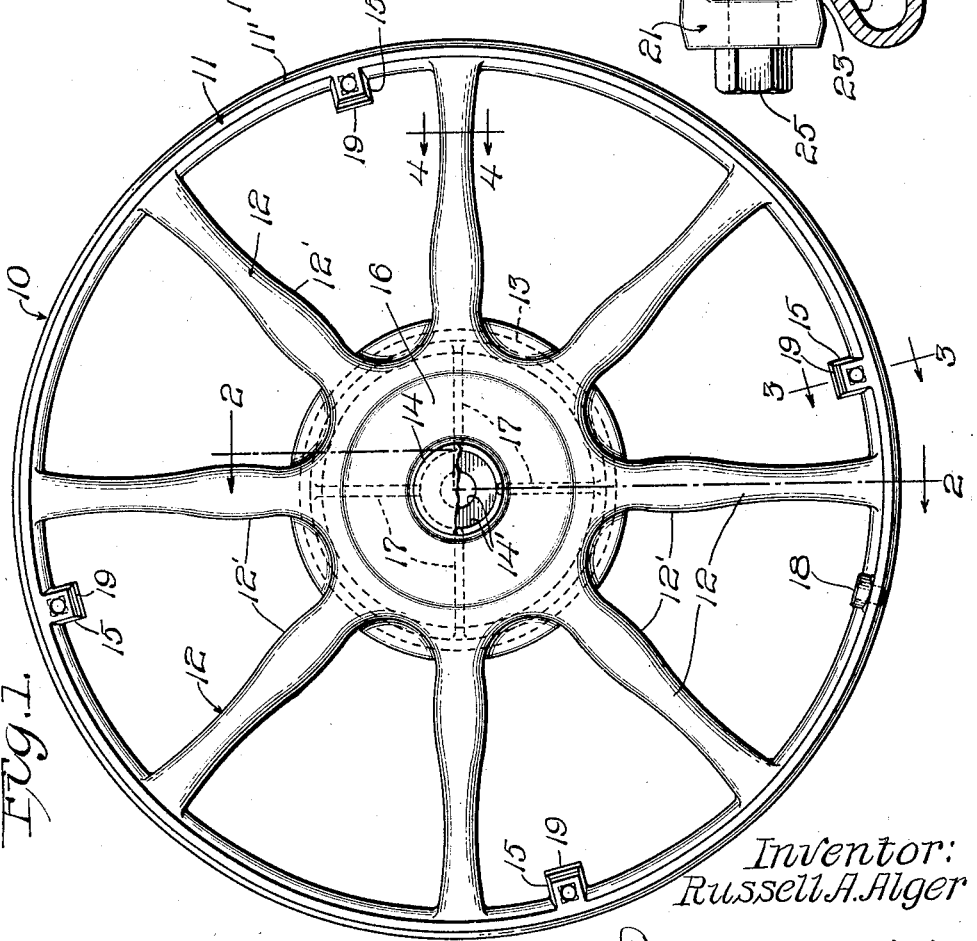

RUSSELL A. ALGER, OF DETROIT, MICHIGAN.

VEHICLE-WHEEL.

1,386,086.   Specification of Letters Patent.   Patented Aug. 2, 1921.

Application filed January 14, 1921. Serial No. 437,143.

*To all whom it may concern:*

Be it known that I, RUSSELL A. ALGER, a citizen of the United States, residing at Detroit, in the county of Wayne and State of Michigan, have invented certain new and useful Improvements in Vehicle-Wheels, of which the following is a specification.

My invention relates to vehicle wheels and has for its general object to provide a vehicle wheel that may combine advantages of lightness of weight, great strength, freedom from effect of varying atmospheric conditions, unitary construction, simplicity, ease of manufacture and inexpensiveness.

My invention may advantageously be embodied in automobile wheels, and, so employed, affords further advantage in the effective provision of unitary brake-drum structure, applicability of a tire rim without use of a felly band, and availability of the structure to be made in many attractive designs and with a disposition of weight and strength that are not available in automobile wheels of wood, disk, or wire-spoked construction.

Other and further objects and advantages of my improved wheel will become apparent from the following description taken in conjunction with the accompanying drawings wherein I have shown an embodiment of my invention in an automobile wheel for purposes of disclosure but without intent to limit the invention in some of its aspects to this particular utilization.

In the drawings Figure 1 is an exterior side elevation of the wheel with the lower portion of the structure machined and the upper portion as initially forged; Fig. 2 is a vertical section on line 2—2 of Fig. 1, with a fragment of the rim in elevation; Fig. 3 is a section through a rim-equipped felly, taken at a point indicated by line 3—3 of Fig. 1 and Fig. 4 is a section on line 4—4 of Fig. 1.

In manufacture I forge the wheel, 10, as to its felly 11, spokes 12, and center-body (shown as including brake-drum 13, hub 14 and disk 16) and preferably also as to its rim-lugs 15, in an integral structure, so that only a minimum amount of machining is necessary for completion of the commercial wheel. In the detailed construction shown, the hub 14, of suitable contour in cross-section is integrally united with a center-disk 16. This disk springing from a plane transverse to the hub axis that preferably is slightly outward from the longitudinal center of the hub, has an inwardly dished contour in cross-section and may be reinforced by an inwardly extending flange and with radial ribs, if desired. As shown, such disk extends to approximately the circular line of the brake drum, which integrally connects with and forms a stiffening inwardly-projecting flange upon the marginal portion of said disk. This drum 13, as best shown in Fig. 2, is initially formed in inwardly tapered shape as shown above the center in Fig. 2, but may subsequently be machined to give a true cylindrical surface 13' on which the inner brake band may act,—and for additional strength of the center portion of the wheel, and to stiffen the brake drum, radial webs 17 may extend at intervals from the inner perimeter of the drum structure 13 to the periphery of the inwardly projecting portion of the hub 14. Of course the hub, initially preferably forged in a solid block, may be machined as at 14' to provide suitably for the reception of the axle end, wheel nut or other attaching adjunct.

The spokes 12 preferably extend radially in slightly dished formation from the circular center-body, as from the margin of the center disk 16, to which, and to the annular flange constituting the brake-drum, their roots are integrally united. In the form illustrated such spokes terminate at and are integrally united with the rim 11. Each spoke is preferably made of semi-tubular shape in cross section, as shown in Fig. 4, that is to say it has a convexo-concave shape in cross-section with its curve outwardly presented the depth of the spoke, from the crest of its curve to the edge of its channel being therefore considerably greater than the thickness of the spoke-wall or the thickness of the disk 16. To enhance the spoke's strength at any selected point as, for instance, a point approximately a third of the distance from the root to the tip of the spoke, it may be made larger than at other points by increasing its width and flattening its curvature, as shown in Fig. 4, or in other contours the metal-quantity at the selected position may be made accordant with the strength-demand. Thus as shown in Fig. 1, each spoke has the swelled portion 12' of pleasing outline with effective increase of strength.

The felly 11 into which the spokes merge, with their tips preferably widened as at 12" for increased strength and rigidity, may be of nearly uniform cross-section slightly thicker at the spoke line than at the side surfaces, but with its peripheral surface tapered as at 11', frusto-conically, from the inside of the wheel toward the outside. The felly has an apertured boss 18 for tire-stem reception and at suitable intervals has integral, inwardly projecting lugs or supports 15 for the rim-retaining means, each lug having a stop-shoulder 19. Rim 20, of "clencher" or other form as desired, has an inner periphery of two diameters to coact with different zones of the tapered felly, and to retain it, without the use of a felly-band, clamp-pieces 21 each having an inner finger 22 to coact with stop 19 and an outer wedge-finger 23 to engage against and under the rim 20 are mounted on the bolts 24 to be tensioned by nuts 25. The carriage bolts 24 are preferably forged in place, but the lugs 15 may be forged solidly and machined to receive these bolts.

It will be understood that wheels forged as above described may be made of approximately the weight of the same size of all wood wheels, with several times the strength of the wood wheel, that the integrally formed structure cannot be subject to the working loose of spokes, loss of alinement from warping or severe strains, loosening of brake-drum, or various other ills that are possible in the forms of automobile wheels now commonly in use and that, with suitable equipment, quantity production of the forged wheels is possible at low expense.

While specification of requirements of particular customers may demand variation in the quality of forge-steel employed, and dictate the use of different alloys, the steel of initial characteristic suitable for forging will generally retain its malleability to an adequate extent to prevent brittleness in the product, and the uniformity of strength-distribution and homogeneity of the material mechanically produced in the forging operation give to the wheel a resultant physical characteristic of durability, ability to withstand radial or transverse shocks, resiliency, and indifference to climatic conditions that is important and desirable aside from the absence of a multiplicity of parts that are susceptible of becoming loose and are separately and to different extents subject to deterioration.

While I have herein described in some detail a particular embodiment of my invention for purposes of full disclosure it will be understood by those skilled in the art that many changes in detail might be made without departure from the spirit of my invention, hereinafter claimed.

I claim:

1. An automobile wheel of steel comprising in an integral forged structure, a hub, a felly, connecting spokes and a brake-drum.

2. An automobile wheel of steel comprising in an integral forged structure, a hub, a felly, connecting spokes, and a brake-drum connecting the roots of the spokes.

3. A forged steel automobile wheel comprising in an integral structure, a felly, spokes, a center disk uniting the roots of the spokes and a hub.

4. A forged steel automobile wheel comprising in an integral structure, a felly, spokes, a center disk uniting the roots of the spokes, a hub, and a brake-drum projecting from the marginal portion of said disk.

5. A forged steel automobile wheel comprising in an integral structure, a felly, spokes, a center disk uniting the roots of the spokes, a hub, a brake-drum projecting from the marginal portion of said disk, and webs connecting the inner periphery of the brake-drum with the outer periphery of the hub.

6. A unitary steel wheel comprising in an integral structure, a hub, spokes, felly, and rim-retaining lugs on the felly.

7. A forged steel wheel comprising in an integral structure, a hub, spokes, felly, and rim-retaining lugs on the felly, said felly having frusto-conical shape externally.

8. A steel wheel comprising in an integrally forged structure, a center-body including a disk portion and a flange laterally extending therefrom, a felly, and connecting spokes extending from center-body to felly.

9. A steel wheel structure comprising in an integrally forged unit, a center-body that includes a relatively thin disk portion, and a lateral flange on the disk portion, and spokes of greater depth than the disk portion springing from the disk portion and at their roots merging also into the flange.

10. A steel wheel comprising in an integrally forged structure, a center-body including a relatively thin disk portion, a lateral flange thereon near the margin of the disk portion, a felly, and parti-tubular spokes connecting the felly with the center-body and having their roots merging into the disk and flange.

11. A steel wheel structure comprising in an integrally forged unit, a center-body including a disk portion and radial spokes springing from said disk portion and swelled in one dimension at a point intermediate their roots and their tips.

12. A steel wheel structure comprising in an integrally forged unit, a center-body including a disk portion having a lateral extension thereon, radial spokes of greater depth than the thickness of the disk having their roots springing from the disk and extension, and a felly uniting the tips of the spokes.

13. A steel wheel structure comprising in an integrally forged unit, a center-body including a disk portion having a lateral extension thereon, and spokes of greater depth than the thickness of the disk, swelled in contour between their tips and roots, and at their roots united with the disk and its extension.

14. In a forged steel wheel, an integral structure comprising a felly and rim-retaining lugs on the inner periphery of the felly.

15. In a forged steel wheel, an integral structure comprising a felly and rim-retaining lugs on the inner periphery of the felly, said felly having frusto-conical shape externally.

16. In a forged steel wheel, an integral structure comprising a felly and rim-retaining lugs on the inner periphery of the felly, and bolts forged in place in said lugs.

17. A steel wheel structure comprising, in an integrally forged unit, a center-body including a relatively thin disk portion, a lateral flange extending from the disk portion and ribs extending radially of the flange on the disk portion; and spokes of greater depth than the disk portion and at their roots merging into the disk portion and the flange.

RUSSELL A. ALGER.